US009617962B2

(12) United States Patent
Boog et al.

(10) Patent No.: US 9,617,962 B2
(45) Date of Patent: Apr. 11, 2017

(54) COMMON-RAIL SYSTEM, INTERNAL COMBUSTION ENGINE AND DEVICE AND METHOD FOR CONTROLLING AND/OR REGULATING AN INTERNAL COMBUSTION ENGINE

(75) Inventors: Manuel Boog, Baindt (DE); Gerald Fast, Markdorf (DE); Robby Gerbeth, Friedrichshafen (DE); Michael Walder, Ravensburg (DE); Ralf Speetzen, Friedrichshafen (DE); Jörg Remele, Hagnau (DE)

(73) Assignee: MTU Friedrichshafen GmbH, Friedrichshafen (DE)

( * ) Notice: Subject to any disclaimer, the term of this patent is extended or adjusted under 35 U.S.C. 154(b) by 395 days.

(21) Appl. No.: 14/238,990

(22) PCT Filed: Aug. 8, 2012

(86) PCT No.: PCT/EP2012/003379

§ 371 (c)(1),
(2), (4) Date: Feb. 14, 2014

(87) PCT Pub. No.: WO2013/023758

PCT Pub. Date: Feb. 21, 2013

(65) Prior Publication Data

US 2014/0209065 A1 Jul. 31, 2014

(30) Foreign Application Priority Data

Aug. 16, 2011 (DE) ........................ 10 2011 080 990

(51) Int. Cl.
*B60T 7/12* (2006.01)
*F02M 55/02* (2006.01)
(Continued)

(52) U.S. Cl.
CPC ........... *F02M 55/025* (2013.01); *F02D 41/26* (2013.01); *F02D 41/3809* (2013.01)

(58) Field of Classification Search
CPC .. F02D 41/3809; F02D 41/20; F02M 37/0029
(Continued)

(56) References Cited

U.S. PATENT DOCUMENTS 7,475,676 B2 1/2009 Remele et al.
7,606,656 B2 * 10/2009 Dolker ................ F02D 41/3854 123/456

(Continued)

FOREIGN PATENT DOCUMENTS

DE 10117809 A1 10/2002
DE 102006059007 B3 6/2008

(Continued)

OTHER PUBLICATIONS

Schnelle-Werner, O. et al.: Das neue MTU-Motormanagementsystem ADEC. In: MTZ Nov. 2007, Jahrgang 68. S. 944-951.—ISBN.

(Continued)

*Primary Examiner* — John Kwon
(74) *Attorney, Agent, or Firm* — Reising Ethington PC

(57) ABSTRACT

Exemplary illustrations are provided of a common rail system for an internal combustion engine, having a rail for fuel and an injector for the purpose of injecting the fuel into a working space of the internal combustion engine, said injector having a fluid connection to said rail via a high-pressure conduit. The high-pressure conduit may have a high-pressure component with an individual reservoir, and the high-pressure conduit and/or the rail may have a pressure measurement device. The pressure measurement device may be coupled to a local logic and storage device of a decentralized, local electronic device which is designed for the (Continued)

purpose of locally analyzing and storing measurement data of the pressure measurement device, e.g., injector data and/or rail data, and the pressure measurement device is connected to the central electronic device via a bus, with the local logic and storage device connected between the same.

18 Claims, 2 Drawing Sheets

(51) Int. Cl.
*F02D 41/26* (2006.01)
*F02D 41/38* (2006.01)

(58) Field of Classification Search
USPC ......... 701/104, 113, 114; 123/456–458, 491, 123/479, 480, 690
See application file for complete search history.

(56) References Cited

U.S. PATENT DOCUMENTS

| | | | | |
|---|---|---|---|---|
| 7,765,995 | B2 * | 8/2010 | Nakata | F02D 41/221 123/490 |
| 7,769,530 | B2 | 8/2010 | Hehle et al. | |
| 7,933,712 | B2 * | 4/2011 | Ishizuka | F02D 41/22 123/479 |
| 8,155,859 | B2 * | 4/2012 | Nakata | F02D 41/2474 701/103 |
| 2003/0154956 | A1 | 8/2003 | Eckerle et al. | |
| 2005/0103312 | A1 * | 5/2005 | Uchiyama | F02D 41/221 123/457 |
| 2006/0266332 | A1 * | 11/2006 | Kloos | F02D 41/008 123/446 |
| 2008/0027625 | A1 * | 1/2008 | Kloos | F02D 41/3809 701/103 |
| 2009/0056676 | A1 * | 3/2009 | Nakata | F02D 41/221 123/478 |
| 2009/0056677 | A1 * | 3/2009 | Nakata | F02D 41/221 123/480 |
| 2009/0056678 | A1 * | 3/2009 | Nakata | F02D 41/221 123/480 |
| 2009/0063011 | A1 * | 3/2009 | Nakata | F02D 41/2474 701/103 |
| 2010/0161080 | A1 | 6/2010 | Hioki et al. | |
| 2010/0280743 | A1 * | 11/2010 | Hehle | G01L 23/24 701/103 |
| 2011/0130944 | A1 * | 6/2011 | Walder | F02D 41/3809 701/103 |

FOREIGN PATENT DOCUMENTS

| | | | |
|---|---|---|---|
| DE | 102007027943 | B3 | 10/2008 |
| DE | 102007045606 | B3 | 2/2009 |

OTHER PUBLICATIONS

International Search Report and Written Communication dated Nov. 26, 2012 for PCT/EP2012/003379.

* cited by examiner

COMMON-RAIL SYSTEM, INTERNAL COMBUSTION ENGINE AND DEVICE AND METHOD FOR CONTROLLING AND/OR REGULATING AN INTERNAL COMBUSTION ENGINE

CROSS REFERENCE TO RELATED APPLICATIONS

This application is a National Phase Application related to PCT/EP2012/003379 filed on Aug. 8, 2012, which application claims priority to DE 10 2011 080 990.2, filed on Aug. 16, 2011, which applications are incorporated herein by reference in their entireties.

TECHNICAL FIELD

The present disclosure relates to a common rail system for an internal combustion engine. More specifically, the present disclosure is directed to an injector that is connected via a high-pressure conduit for fuel to a rail for the purpose of injecting the fuel into a working space of an internal combustion engine, wherein the high-pressure conduit has a high-pressure component with an individual reservoir which has a pressure measurement device.

BACKGROUND

By means of such a pressure measurement device, it is possible, by way of example, to determine the pressure in an individual reservoir in a common rail system in a particularly reliable manner. Such a system has been described in DE 10 2009 002 793 A1 or in DE 10 2006 034 515 B3 by the applicant. In these cases, the advantages of a common rail system having an individual reservoir are applied.

Moreover, other measurement devices can be connected in principle to a high-pressure component. Overall, the system named above serves the purpose of influencing an injection start and an injection end of the injector, and therefore significantly influencing the quality of the combustion and the composition of the exhaust gases in an internal combustion engine. In order to comply with the threshold value stipulated by law, the injection start and the injection end, among other things, are regulated as parameters by an electronic device. In practice, in the case of an internal combustion engine having a common rail system, the problem arises that a time shift arises between the start of flow in the injector, the lift of the injector needle, and the actual start of injection. The same applies accordingly to the end of the injection. Imprecision in the regulation of the start of injection and the end of injection eventually leads to imprecision as concerns the fuel volume fed to the internal combustion engine.

Despite precise sensors, the concept named above can lead to imprecisions —for example due to injection behaviors which vary with the lifetime of the injectors. Moreover, it is desirable to be able to make a concrete diagnosis of, and address, the causes of a failure, malfunctions, or other drifts of injectors.

SUMMARY

The exemplary illustrations proceed from this point, and the problem addressed includes, in one exemplary illustration, further developing a common rail system of the type named above. In particular, it should be possible to detect and analyze injector values with an individual reservoir in an improved manner. This should particularly be possible for the case of a pressure measurement device. In particular, this should also be possible for the case of an aging or exchanged injector.

The problem as concerns the common rail system is addressed by an exemplary common rail system of the type described above. In one example, the pressure measurement device is coupled to a local logic and storage device which is designed to locally analyze and save injector data and/or rail data.

In another example, the systems of the type described above, previously known in the prior art and having central electronic devices, can be further improved. In one example, this may relate to internal combustion engines with comparably small numbers of cylinders, from perhaps 4 to 8 or 10 cylinders. In this case, it has in fact proven to be cost-effective—even on-location—to include a logic and storage device [and]a pressure measurement device on each or for each cylinder, said device being designed particularly to locally analyze and save data of an injector. Moreover, however, the concept of this example can also be advantageous for engines with high numbers of cylinders, because a more effective data function and more secure analysis, and/or assignment of analyzed data to a particular cylinder, is possible as a result. Overall, the exemplary illustrations enable the storage of data specific to a high-pressure component—such as an injector or an individual reservoir, for example, and/or of the rail, by means of the decentralized electronic device realized in this manner, and makes it possible to carry out an analysis locally at the location where the data is generated.

Individual data specifically, such as manufacturer information, inspection data, settings, or other injector-specific data, as well as diagnosis data for an injector, can be detected non-centrally in this manner and saved and/or analyzed. In addition, the function of securing data can be taken over locally, which has advantages in the event of data loss in the central electronic device. Overall, as a result of the exemplary illustrations and possible implementations thereof, a comparably good signal quality results for the local logic and storage device on the cylinder and/or injector due simply to the shorter sensor lines, and an accordingly possible high scanning frequency also results. A noisy or reduced signal quality, which frequently arises in the transmission of an analog sensor signal in longer lines, is avoided in this manner. In addition, the transmission of data is more effective and fast, because an efficient handling of data is enabled by means of the concept of a local logic and storage device in addition to a central logic and storage device. This also leads to a reduction in the load of the central logic and storage device with respect to the storage and processing capacity thereof. It is advantageous that only analyzed data is transmitted from the decentralized, local electronic device to the central logic and storage device. In sum, a reduced data volume results, with a reduction in the load on the databus, such as a CAN bus for example, and also a data volume of improved quality result on the databus.

The exemplary illustrations also include an internal combustion engine, and to a device for the control and/or the regulation of the internal combustion engine. The problem concerning the method is addressed in one exemplary illustration by a method of the type named above. According to this example, the pressure of the individual reservoir is measured via a pressure measurement device on the individual reservoir directly following or prior to a hydraulic resistor of the high-pressure conduit, and is analyzed in a local logic and storage device, wherein in addition only selected data is transmitted to the central electronic control device on a bus.

Additional advantageous implementations of the exemplary illustration are also found in the dependent claims and description below, and provide specific additional advantageous options for realizing the concepts explained above in the context of the problem specification, as well as further advantages.

In one exemplary illustration, the local logic and storage device can include an injector model for model-based injector regulation. In this way, it is possible to a certain extent to undertake an analysis of injector data at this point. The local logic and storage device also advantageously comprises a diagnosis model for the model-based diagnosis and/or analysis of injector data. This can include, by way of example, parity equations, observation methods, or parameter estimation methods.

In another example, it has been proven beneficial to couple the local logic and storage device to a local pressure sensor system. The pressure measurement device may be constructed in the form of an extensometer. The extensometer can be constructed, for example, in the form of a strain gauge. A strain gauge may be arranged on the outer side of the individual reservoir, wherein the individual reservoir is directly preceded by or followed by a hydraulic resistor for the purpose of integration into the high-pressure conduit. The implementation can particularly be used in a configuration of the high-pressure conduit with an individual reservoir and hydraulic resistor to the individual reservoir with adequately reliable raw data. The raw data have—as recognized by the implementation—such a high signal quality that a local logic and storage device, with appropriate measurement effort, is already capable of undertaking a significant analysis.

In an exemplary illustration of a common rail system, it has proven beneficial for the storage device to be able to separate from the logic device. This has the advantage that different and/or differently designed storage devices can be made available for a logic system of a decentralized, local electronic device in combination with a central electronic control device. In particular, it has proven advantageous that when the logic device and the storage device are separated, the storage device is designed to remain on a high-pressure component. The implementation named above has proven particularly advantageous in the case of a high-pressure component in the form an injector. This measure, however, can also be advantageous for a high-pressure component in the form of an individual reservoir or a rail. In this implementation, the problem has been recognized that, particularly in the case of an injector, certain high-pressure components are subject to aging, and therefore their properties—which are typically relevant for the injection—can change. Such changes can be determined and saved via the local logic and storage device. This can be advantageously utilized for an adaptive electronic system with a central electronic control device and decentralized, local electronic device, which adjusts to the aging of the high-pressure component. However, it can still be problematic if an exchange is necessary for an aging high-pressure component—such as an injector or an individual reservoir, or even a rail. In this case, the specific data which is relevant for the aging high-pressure component would be present in a ring buffer, for example, of the local logic and storage device for the high-pressure component if the ring buffer is not exchanged with the component. In this implementation, it has been recognized that it may be particularly advantageous if relevant identification data and information and/or diagnosis data for the high-pressure component is always carried along with the high-pressure component and made available—and in a particularly advantageous manner in the storage which is exchanged with the high-pressure component and can be connected to the local logic device. The local storage device which can be exchanged can therefore be essentially coupled to the logic system together with the relevant data for the high-pressure component—more or less in the form of an electronic fingerprint. As such, diagnosis data such as aging data, flow behavior, or the like are available with an exchanged or inserted high-pressure component. In the event of a high-pressure component being swapped out—for example in the case of the injector or the individual reservoir being exchanged—it is still nevertheless possible for an injection behavior which is tuned to the exchanged component to be adapted for the cylinder affected by the exchange. By way of example, this has the advantage that an injector can be swapped from a first cylinder to a second cylinder with no problem, and the exchanged high-pressure component in this case carries data material which is relevant for the injection behavior with it.

Exemplary illustrations are described below with reference to the drawing. This is not intended to necessarily illustrate the exemplary illustrations to-scale. Rather, the drawing is presented in a schematic and/or slightly distorted form where this assists in the explanation. As far as further developments of the teaching which can be directly seen in the drawing are concerned, reference is hereby made to the relevant prior art. It must be noted here that numerous modifications and alterations regarding the form and the detail of any particular example can be undertaken without departing from the general idea of the exemplary illustrations. The features of the exemplary illustrations disclosed in the description, in the drawing, and in the claims can be useful for the implementation of the exemplary illustrations both individually and in any specific combination thereof. In addition, all combinations of at least two of the features disclosed in the description, in the drawing, and/or in the claims fall without the scope of the exemplary illustrations. The exemplary illustrations are not limited to the exact form or the detail of the example(s) shown and described below, or limited to a subject matter which would be restricted in comparison to the subject matter claimed in the claims. Where size ranges are given, values lying within the named boundaries are also hereby disclosed as boundary values, and can be applied and claimed in any and all manners. For reasons of simplicity, the same reference numbers have been used below for identical or similar parts, or for parts having identical or similar functions.

BRIEF DESCRIPTION OF THE DRAWINGS

Additional advantages, features, and details of the exemplary illustrations are found in the following description of the various examples and with reference to the drawing, wherein.

DETAILED DESCRIPTION

Figure 1:
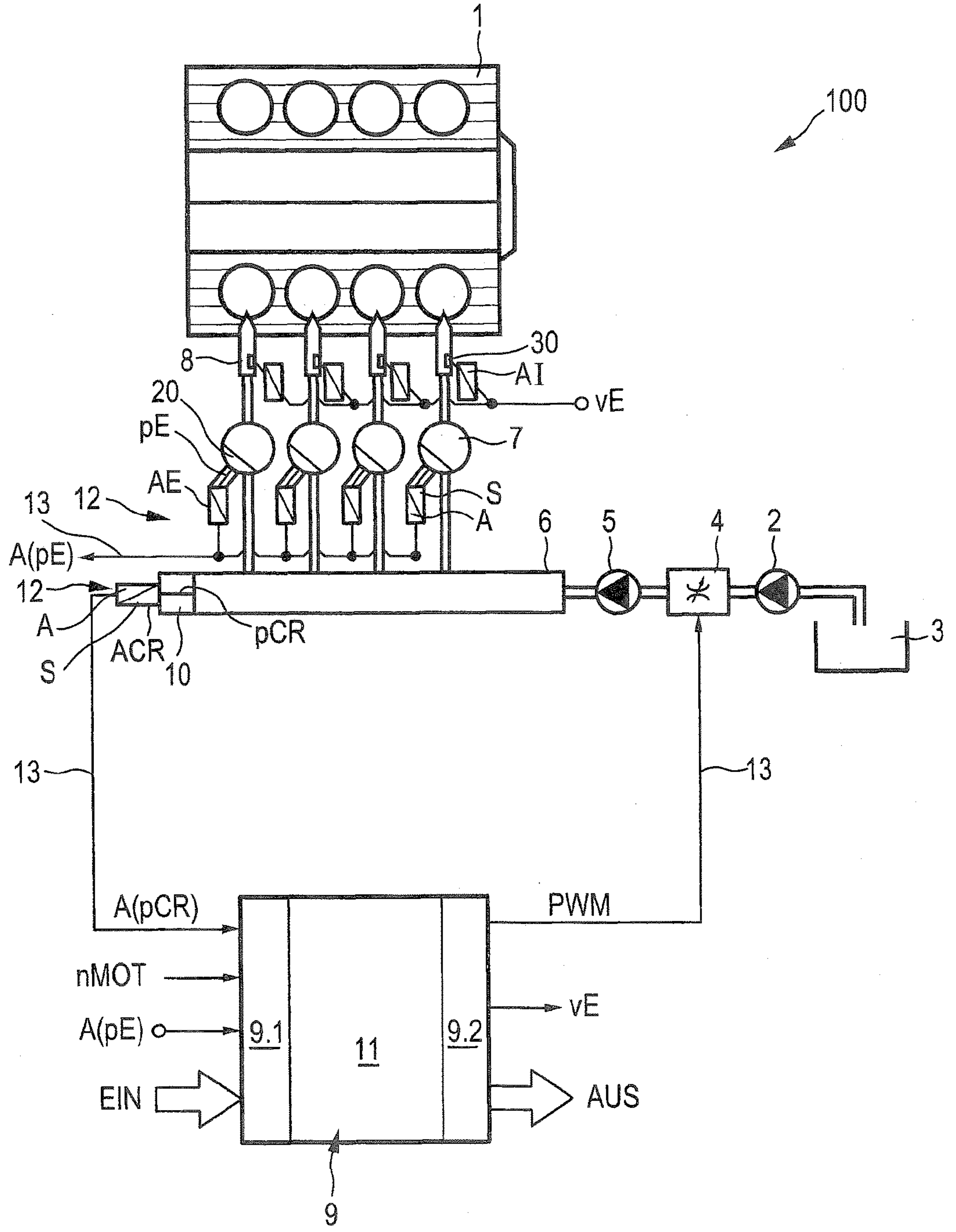
FIG. 1 shows a schematic illustration of an exemplary internal combustion engine having a common rail system and a high-pressure component with an individual reservoir, as well as with a central electronic device and a local logic and storage device according to an exemplary illustration.

FIG. 1 shows an example of a common rail system 100 which is designed in a substantially analogous manner to that of DE 10 2006 034 515 B3 as named above, having an electronically controlled internal combustion engine 1. The common rail system 100 may have a low-pressure pump 2 for the conveyance of fuel from a fuel tank 3, an intake throttle 4 for setting a flow volume, and a high-pressure pump 5 for conveying the fuel initially into a rail 6 while increasing the pressure thereof. The fuel is relayed by the rail 6 into an individual reservoir 7 provided for each cylinder of the internal combustion engine 1 as intermediate storage of the pressurized fuel, and finally is further conveyed into an injector 8 for the purpose of injection of the fuel into the cylinder and/or into the combustion chamber of the internal combustion engine 1.

In a system shown here, the fuel is sufficiently pressurized in the individual reservoir 7 to ensure adequate injection into the combustion chamber of the internal combustion engine 1. In addition, the configuration dampens feedback of interference frequencies into the rail 6 by means of a corresponding design of the feed line from the rail 6 to the individual reservoir 7, meaning that the connection line from the rail 6 to the individual reservoir 7 has an accordingly high hydraulic resistance. This system is regulated both by an electronic control device (ADEC or ECU) of a central electronic device 9 (with a central logic 11) and by a decentralized, local electronic device 12. A decentralized, local electronic device 12 has a number of locally implemented (each at the respective locations where the data is created) logic and storage devices ACR, AE, AI, each of which are directly connected at that location to one respective sensor 10, 20, 30.

The common rail system 100 in FIG. 1 is hereby explained as an example. The electronic control device of the central electronic device 9 contains components of a microcomputer system with a central logic 11 as well as an input and output 9.1, 9.2 of the electronic control device of the central electronic control device 9—by way of example, a microprocessor and a buffer and storage components (EEPROM, RAM) to form the central logic 11, and I/O components to form the input 9.1 and output 9.2. The operating data which is relevant for the operation of the internal combustion engine 1 is applied in operating maps and/or characteristic curves in the storage components. Using these, the electronic control device of the central electronic device 9 in the central logic 11 calculates the output values AUS provided at the output 9.2 from the input values EIN received at the input 9.1. The following input values are illustrated as an example in FIG. 1:

- a rail pressure A(pCR) which has already been analyzed, measured by means of a rail pressure sensor 10 and analyzed in a local logic and storage device ACR,
- a rotation speed signal nMot of the internal combustion engine 1,
- pressure signals A(pE) which have already been analyzed, from the individual reservoir 7, wherein pressure signals pE of the individual reservoir 7 have previously been analyzed by these local logic and storage devices AE functionally assigned to the respective locations.

Moreover, there are further, additional input values in the example described here, which are not illustrated in detail, and which shall be included as a collective under the terms EIN and AUS, including the charge air pressure of a turbocharger, and the temperatures of the coolant/lubricant and of the fuel, as well as further output values, by way of example. A signal PWM for the purpose of controlling the intake throttle 4, and a power-determining signal vE—by way of example, an injection volume for the purpose of relaying a target torque in the case of torque-based regulation—are illustrated here in the concrete case as the output values of the electronic control device of the central electronic control device 9. The output value AUS represents the further adjustment signals for the purpose of controlling and regulating the internal combustion engine 1.

In contrast to the known common rail systems, such as are described in DE 10 2006 034 515 B3, by way of example, a local measurement device—which is a rail pressure sensor 10 and an individual reservoir pressure sensor 20 in this case, as well as an injector pressure sensor 30 which shall be understood as an option are therefore each coupled in the present case to a local logic and storage device ACR, AE—and optionally AI—of the decentralized, local electronic device 12—particularly a rail logic and storage device ACR and an individual reservoir and injector logic and storage device AE, AI. It is possible that only one of the logic and storage devices AE, AI is included, such that one of the two is optional. The present example only includes the individual reservoir logic and storage device AE, such that the injector logic and storage device AI shown in FIG. 1 should be considered as optional. The logic and storage devices ACR, AE are each designed to locally analyze and store measurement data of the common rail system 100.

In the present case, this data is specifically the pressure data of a rail pressure pCR on the rail 6, and pressure data of an individual reservoir pressure pE on the individual reservoir 7. The analyzed measurement data A(pE) and A(pCR) are each relayed from the output of the local logic and storage devices AE, ACR to the electronic control device (ADEC or ECU) of the central electronic control device 9 having the central logic 11, via the input 9.1 thereof.

In one exemplary approach not shown here, but adapted from the above, it is also possible for pressure signals A(pl) of the injector 8, said signals having previously been analyzed, to be provided on the databus 13 by a local logic and storage device AI, meaning that the electronic control device (ADEC or ECU) of the central electronic control device 9 having the central logic 11 relays the same from the output of the local logic and storage devices AI via the input 9.1 of said electronic control device (ADEC or ECU).

Accordingly, the local logic and storage device AE is arranged as an integrated component with the individual reservoir pressure sensor 20, in the form of a strain gauge, on the individual reservoir 7. In one variant, the individual reservoir 7 can also be constructed together with the injector 8 in a single housing. In this case as well, the individual reservoir pressure sensor 20 is configured as a strain gauge directly together with a local logic and storage device AE on the individual reservoir 7 of the injector, as an integrated component. Similarly, the local logic and storage device ACR for the rail 6 is integrated with the rail pressure sensor 10 on the rail 6.

Figure 2:
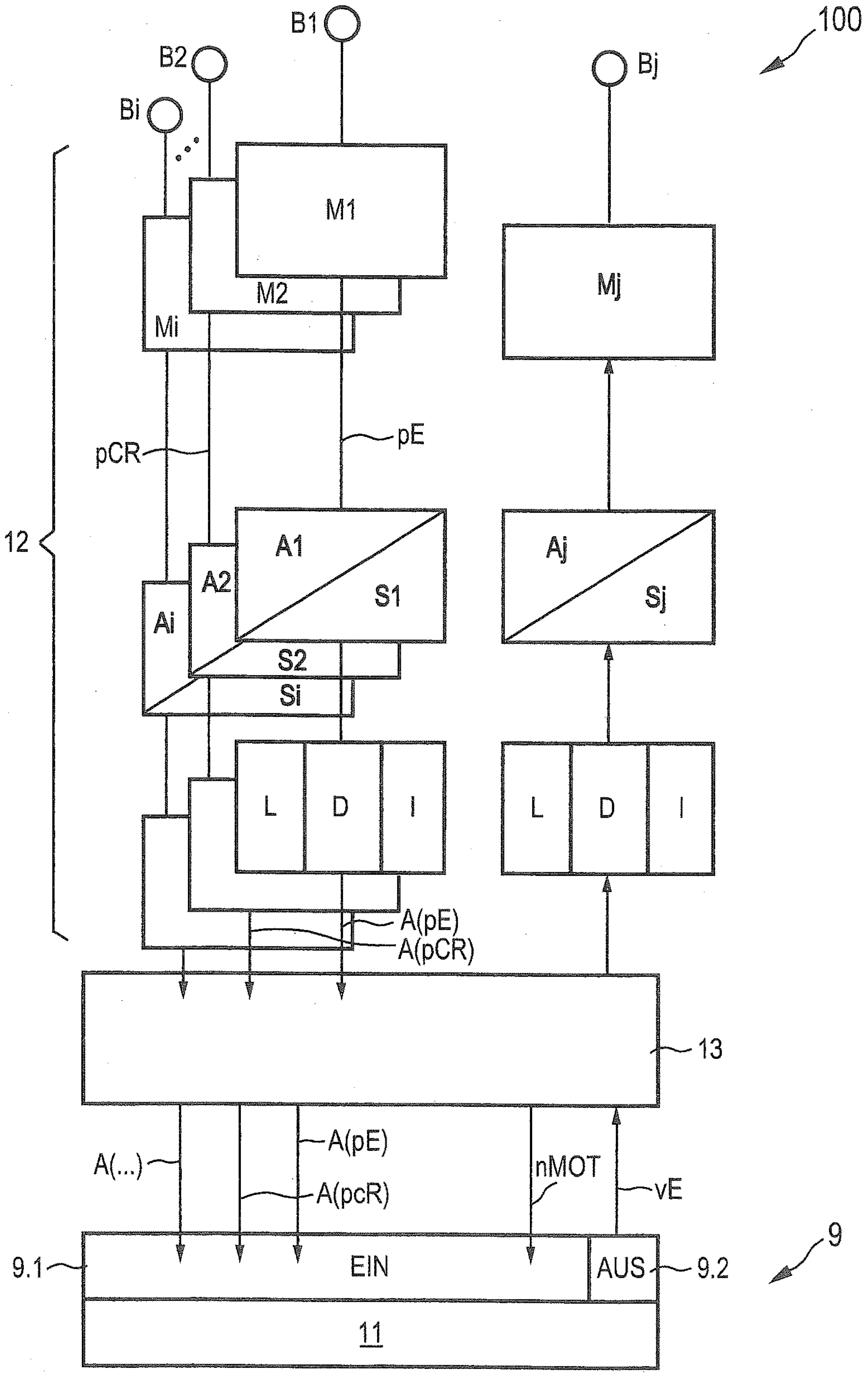
FIG. 2 shows a block diagram of an exemplary method for the determination of measurement data and the analysis (thereof) in a common rail system for an internal combustion engine, having a central electronic device and a local— meaning decentralized—number of logic and storage devices according to one exemplary approach.

The exemplary illustration shown in FIG. 1 follows a general system as schematically illustrated in the block diagram of FIG. 2. The common rail system 100 for an internal combustion engine 1 includes a combined control of the central electronic control device 9 and a decentralized, local electronic device 12. The decentralized, local electronic device 12 is formed as an integrated component consisting of a number of measurement devices M1, M2 . . . Mi and a number of logic and storage devices A1/S1, A2/S2 . . . Ai/Si which are directly accommodated as integrated components of the measurement devices. By way of example, at least the measurement device M1, M2 is a pressure measurement device with an integrated logic and storage device A1/S2, A2/S2 for the purpose of measuring and analyzing an individual reservoir pressure pE and a rail pressure pCR, which function as explained in the context of FIG. 1, and are indicated in the figure by AE and ACR. The further measurement devices Mi can be of another type for example comprising a temperature measurement device or the like, and can likewise each be integrated with a local logic and storage device Ai/Si.

It can be seen in the system in FIG. 2 that a measurement device M1, M2 to Mi is designed to undertake a measurement on the common rail system 100, for example on an individual reservoir (7 in FIG. 1), which is listed as component B1 in this case, or on a rail (6 in FIG. 1) which is listed as component B2 in this case, or another component Bi of the common rail system 100. In any case, in the present example, a local logic and storage device A1/S1, A2/S2 . . . Ai/Si is integrated with the measurement device directly at the location of the measurement device M1, M2 . . . Mi. The logic and storage devices A1/S1, A2/S2 . . . Ai/Si are each capable of analyzing and storing a measurement signal provided by each of the measurement devices M1, M2 to Mi.

By way of example, in the case of a storage device S1 or S2, data which is specific to the injector or the rail, such as manufacturer information, inspection data, and settings, for example, can be saved in the local storage device S1, S2, and can be utilized by the logic device A1, A2 for further analysis. Such, and other, information I can be available for each of the components Bi of the common rail system 100. Moreover, diagnosis data D can be individually, non-centrally detected and saved in a storage device Si for each component Bi. Particularly in the event of a failure, the most recent set of diagnosis data can be provided in a storage device Si—for example designed as a ring buffer. As such, it is possible to provide a datalogger function L over the operating life of a component Bi in a comparatively simple manner.

With respect to the concrete system illustrated in FIG. 1, in the context of a one exemplary illustration, an injector pressure sensor 30 is included as an alternative or in addition to the individual reservoir pressure sensor 20, said injector pressure sensor 30 being able to be read exactly like a local logic and storage device AE for the individual reservoir 7, or a local logic and storage device ACR for the rail 6, as explained above. In the following, a local logic and storage device AI can be included for the injector and the pressure sensor 30, in the form of a strain gauge, included on the injector. The design thereof can be realized in principle according to the same principle as that of the logic and storage device AE and ACR.

In the present case, the logic and storage device AE and/or AI has a storage device S and a logic device A, wherein the storage device S can be separated from the logic device A. As such, the storage device S is intended to remain on the injector and/or the individual reservoir. This means that the storage device S of the logic and storage device AI can be exchanged together with the injector 8 and the strain gauge 30, and/or the storage device S of the logic and storage device AE can be exchanged together with the individual reservoir 7 and the strain gauge 20. This may become necessary as the injector 8 and/or the individual reservoir 7 age. As such, a similar exchange procedure can be carried out as an individual reservoir 7 ages, for example in the case of an injector 8, by exchanging the individual reservoir 7 with the pressure sensor 20, and the storage S. A similar exchange procedure can also be carried out for the rail 6, with the pressure sensor 10 and the storage S, as concerns the logic and storage device ACR—in this case including the separation of the storage S from the logic device A of the logic and storage device ACR.

This has the advantage that the data for aging processes and flow behavior of a high-pressure component, said data playing a role in determining the injection process and being present in the storage S on the high-pressure component, can be exchanged and/or replaced together with the corresponding exchanged or replaced high-pressure component—in this case an exchanged injector 8 (or an exchanged individual reservoir 7 or an exchanged rail 6). This means that the high-pressure component, together with the sensor 10, 20, 30 and storage S present on the same, is connected to the logic system consisting of the decentralized, local electronic device 12 and the central electronic control device 11. In this case, the logic system can therefore work directly with the current diagnosis data D of the high-pressure component. The common rail system 100 is therefore adaptive—even in the case of high-pressure components such as an injector 8, an individual reservoir 7, or a rail 6 being exchanged.

The communication between a central electronic control device 9 and the decentralized, local electronic device 12—for example a logic and storage device AI, AE, or ACR and the central logic 11—is carried out in such a manner that, during operation of the common rail system 100, measurement data such as the pressure profile of an injector 8, or an individual reservoir 7, is transmitted to the central electronic control device 9 and analyzed by the logic device A, meaning that it is transmitted in analyzed form A(pI), A(pE), A(pCR). In the same way, the corresponding data which is relevant to the pressure profile is saved in the storage device S of the high-pressure component that—is, in a storage device S of the logic and storage device AE and ACR and AI, by way of example.

If at this point a high-pressure component, such as an injector 8 or an individual reservoir 7, is exchanged, or is shifted to another location—for example to another cylinder of the internal combustion engine—this high-pressure component takes the relevant diagnosis data concerning the injection process along with it, in the storage device S which is exchanged together with the component. This also applies for a newly inserted high-pressure component. Following the insertion, the individual measurement data which describes age-based developments and which characterizes the high-pressure component, is therefore available to the logic system consisting of the decentralized, local electronic device 12 and the central electronic control device 9 for the purpose of control and regulation, and can be utilized for the control and regulation of the system as a whole. In particular, a time signal provided by the central electronic control device 9 to the decentralized, local electronic device 12 for the purpose of initiating an injection process can also be carried out, upon the exchange of high-pressure components, in such a manner that it is matched to the potentially individual characteristics of the injector 8 or the individual reservoir 7—wherein the individual characteristics can influence the pressure profile.

The decentralized, local electronic device 12 realized in this manner, consisting of the measurement devices M1, M2 to Mi and the local logic and storage device A1/S1, A2/S2 . . . Ai/Si for each of the components Bi, has the advantage that comparably short sensor lines are possible between a sensor of the measurement device Mi and a local logic and storage device Ai/Si. This enables, by way of example, a high scanning frequency via the local logic and storage device—namely the AE, ACR in FIG. 1—which are indicated in this case by A1/S1, A2/S2, and nevertheless with good signal quality. A reduction of the signal quality (the signal to noise ratio) resulting from a longer wiring harness is therefore avoided. Only a signal from the decentralized, local electronic device 12—such as an analyzed individual reservoir pressure A(pE) or an analyzed rail pressure A(pCR) which has been analyzed and accordingly processed, is transmitted to the central electronic control device 9 and/or the control device (ECU or ADEC) thereof. This has the advantage that a data load on the databus 13 is reduced.

On the other hand, the present system also enables the realization of a decentralized, local electronic device 12 following the same principle, on the output end of the electronic control device of the central electronic control device 9 with the central logic 11. This can be realized, by way of example, for a power-determining signal vE as well, which is initially processed in a local logic and storage device Aj/Sj and then fed via an actuator Mj to the system component Bi.

By way of example, a corresponding mathematical model can be saved in a logic and storage device Ai/Si, Aj/Sj, e.g., a computer-readable medium, by means of which it is possible to carry out a model-based component regulation—for example injector regulation or a corresponding diagnosis method. By way of example, the implementation of parity equations, observation systems, and parameter estimation processes, etc. can be contemplated. In addition, due to the comparably small sensor and actuator line, it is possible to realize signal-based diagnosis methods such as frequency analyses or the like.

Overall, the general system explained in the context of FIG. 2 enables a cylinder-specific detection of fuel volumes, injection profiles, leaks, temperatures, injection times, injection start and injection end with high signal and analysis quality as well as cylinder-specific, with high reliability [sic].

A combined architecture of the electronic control device (ADEC, ECU)—as the central electronic control device 9 with central logic 11 and decentralized, local electronic device 12, for example with the named local logic and storage device ACR, AE, AI—therefore enables an improved chronological synchronization of the common rail system 100 to the internal combustion engine 1. As such, the central electronic control device 9 and the injectors 8 or the rail 6, as symbolized by the components B1, B2, have the same time basis, among other things. The requirement of precise knowledge of a crank angle, for example for an injector 8, an individual reservoir 7, or a rail 6 is of lower priority in this case than was previously the case.

As noted above, the exemplary illustrations are not limited to the previously described examples. Rather, a plurality of variants and modifications are possible, which also make use of the ideas of the exemplary illustrations and therefore fall within the protective scope. Accordingly, it is to be understood that the above description is intended to be illustrative and not restrictive.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain examples, and should in no way be construed so as to limit the claimed invention.

Accordingly, it is to be understood that the above description is intended to be illustrative and not restrictive. Many examples and applications other than the examples provided would be upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future examples. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as “a,” “the,” “the,” etc. should be read to recite one or more of the indicated elements unless a claim recites an explicit limitation to the contrary.

The invention claimed is:

1. A common rail system for an internal combustion engine, comprising:

a rail for fuel, and an injector which is connected by a fluid connection via a high-pressure conduit, the injector configured to inject fuel into a working chamber of the internal combustion engine, wherein the high-pressure conduit has a high-pressure component with an individual reservoir, and at least one of the high-pressure conduit and the rail has a pressure measurement device, wherein:

the pressure measurement device is coupled to a local logic and storage device of a decentralized local electronic device, the electronic device being configured to locally analyze and store measurement data from the pressure measurement device, and the pressure measurement device is connected to the central electronic device via a bus, and via the local logic and storage device, and the local logic and storage device is configured, together with the central electronic device to control the common rail system for the internal combustion engine.

2. A common rail system according to claim 1, wherein the pressure measurement device has a plurality of pressure sensors, wherein one local logic and storage device each is functionally assigned to a pressure sensor, and the plurality of local logic and storage devices is connected to the central electronic device via a databus.

3. A common rail system according to claim 1, wherein the local logic and storage device has a ring buffer which is configured to permanently secure the most recent injector data prior to an error, and until a reset following the error.

4. A common rail system according to claim 1, wherein at least one first local logic and storage device provides an injector model configured to employ a model-based injector regulation, and a second local logic and storage device provides a rail model for the purpose of model-based rail regulation.

5. A common rail system according to claim 1, wherein a local logic and storage device provides a diagnosis model configured to employ a model-based analysis of measurement data, of at least one of an individual reservoir, injector, and a rail.

6. A common rail system according to claim 5, wherein the diagnosis model is configured to employ at least one of a parity equation, an observation method, and a parameter estimation method.

7. A common rail system according to claim 1, wherein the logic and storage device is configured to employ at least one of a signal-based analysis and a frequency analysis of a measurement signal.

8. A common rail system according to claim 1, wherein a pressure sensor is formed by one of an extensometer and a strain gauge.

9. A common rail system according to claim 8, wherein a first pressure sensor is arranged on the outer side of a wall of an individual reservoir, and a second pressure sensor is arranged on the outer side of a wall of an injector, and a third pressure sensor is arranged on the outer side of a wall of the rail, particularly wherein a hydraulic resistor is arranged immediately upstream or downstream of the individual reservoir and is integrated into the high-pressure conduit.

10. A common rail system according to claim 1, wherein the high-pressure component is in the form of one of an injector, an individual reservoir, and an injector with an integrated individual reservoir.

11. A common rail system according to claim 1, wherein the local logic and storage device has a logic device and a storage device, wherein the storage device is configured to be separated from the logic device.

12. A common rail system according to claim 11, wherein the storage device is configured to remain on the high-pressure component upon separation from the logic device, and is configured to be selectively exchanged with the high-pressure component.

13. An internal combustion engine having a common rail system, according to claim 1, having an electronic device configured to control and regulate the internal combustion engine, said electronic device having a central electronic device and a local logic and storage device which are connected to each other via a databus, wherein the central electronic device is configured to receive an analysis signal for measurement data from a pressure sensor, said measurement data being previously analyzed by the local logic and storage device.

14. An internal combustion engine according to claim 13, wherein a first local logic and storage device has a signal input which is connected to a signal output of a pressure sensor on the individual reservoir, wherein the pressure sensor is configured to measure the pressure of the individual reservoir, and a second local logic and storage device has a signal input which is connected to a signal output of a pressure sensor on an injector, wherein the pressure sensor is configured to measure the pressure of the injector, and a third local logic and storage device has a signal input which is connected to a signal output of a pressure sensor on the rail, wherein the pressure sensor is configured to measure the pressure of the rail.

15. A device for controlling and/or regulating an internal combustion engine, according to claim 13, said device being configured to locally process measurement data of a pressure measurement device for the pressure of an individual reservoir and/or an injector and/or rails while providing at least one analysis signal, and to receive the at least one analysis signal, for measurement data from the pressure measurement device, said measurement data being analyzed previously.

16. A device according to claim 15, further comprising a central electronic device having a signal input which is connected to a signal output of a local logic and storage device via a databus for the purpose of making a signal connection, wherein the local logic and storage device is coupled to the pressure sensor.

17. A method for controlling an internal combustion engine, having a common rail system according to claim 1, by means of an electronic device made for the purpose of controlling and/or regulating, wherein a pressure of the individual reservoir and/or injector and/or rail is detected during a measurement interval, and a significant change in the pressure is used to control an injection start or an injection end, comprising:

measuring the pressure of at least one of the individual reservoir, the injector, and the rail via a pressure sensor, on the individual reservoir, directly after or before a hydraulic resistor in the high-pressure conduit, and analyzing, in each local logic and storage device, each decentralized, local electronic device coupled to the pressure sensor, and sending only analyzed data on the databus to a logic of a central electronic device of the electronic device.

18. A method for controlling and/or regulating an internal combustion engine according to claim 17, wherein a storage device of the logic and storage device which is configured to be separated from a logic device remains on at least one of the individual reservoir, the injector, and/or the rail, when a high-pressure component is exchanged, the high-pressure component including at least one of an individual reservoir, an injector, and a rail.

* * * * *